US012640947B2

(12) United States Patent
Balasubramanian et al.

(10) Patent No.: US 12,640,947 B2
(45) Date of Patent: May 26, 2026

(54) SCALABLE CLUSTER BASED SCORING WITH MULTI-QUEUE DYNAMIC SCHEDULING CONSENSUS MECHANISM IN BLOCKCHAIN

(71) Applicant: Bank of America Corporation, Charlotte, NC (US)

(72) Inventors: Saravanan Balasubramanian, Chennai (IN); Shouryan Sharma, Faridabad (IN); Sharmishtha Kant, Lucknow (IN)

(73) Assignee: Bank of America Corporation, Charlotte, NC (US)

( * ) Notice: Subject to any disclaimer, the term of this patent is extended or adjusted under 35 U.S.C. 154(b) by 161 days.

(21) Appl. No.: 18/636,757

(22) Filed: Apr. 16, 2024

(65) Prior Publication Data

US 2025/0323805 A1 Oct. 16, 2025

(51) Int. Cl.
*H04L 9/00* (2022.01)

(52) U.S. Cl.
CPC ...................................... *H04L 9/50* (2022.05)

(58) Field of Classification Search
CPC ....................................................... H04L 9/50
See application file for complete search history.

(56) References Cited

U.S. PATENT DOCUMENTS 10,671,302 B1 6/2020 Aggarwal et al.
11,126,364 B2 9/2021 Karr et al.

11,228,439 B2 1/2022 Wang
11,581,943 B2 2/2023 Dreier
11,716,385 B2 8/2023 Karumbunathan et al.
11,797,197 B1 10/2023 Karr et al.
2019/0140935 A1 5/2019 Kikinis
2019/0251199 A1 8/2019 Klianev
2019/0386969 A1* 12/2019 Verzun .................. G06F 21/606
2020/0177373 A1 6/2020 Komandur et al.

(Continued)

FOREIGN PATENT DOCUMENTS

CN 112799789 B 8/2023
DE 112020003420 T5 5/2022

(Continued)

*Primary Examiner* — Kristie D Shingles
(74) *Attorney, Agent, or Firm* — Banner & Witcoff, Ltd.

(57) ABSTRACT

Systems and methods are disclosed to revolutionize blockchain consensus mechanisms by introducing a novel, inclusive framework that enhances efficiency, scalability, and environmental sustainability. Central to this breakthrough are a cluster-based scoring system and a multi-queue dynamic scheduling mechanism, designed to replace resource-intensive consensus models like Proof of Work and Proof of Stake. This approach allows nodes to participate based on merit, determined through an iterative scoring process within clusters, democratizing access, and participation across the blockchain network. The system dynamically adjusts mining complexity as the blockchain evolves, ensuring scalability and reducing energy consumption. A key innovation is the introduction of cooldown periods to prevent dominance by any single node, promoting fairness and security. This decentralized, efficient, and scalable solution paves the way for broader blockchain adoption, maintaining the technology's foundational principles while addressing its traditional limitations.

18 Claims, 6 Drawing Sheets

(56) References Cited

U.S. PATENT DOCUMENTS

| | | | |
|---|---|---|---|
| 2021/0182190 A1 | 6/2021 | Gao et al. | |
| 2021/0366586 A1 | 11/2021 | Ryan et al. | |
| 2021/0373761 A1 | 12/2021 | Karr et al. | |
| 2022/0083245 A1* | 3/2022 | Kant | G06F 3/0688 |
| 2023/0251797 A1 | 8/2023 | Kannan et al. | |
| 2023/0281192 A1 | 9/2023 | Quick et al. | |
| 2024/0144141 A1* | 5/2024 | Cella | G06Q 30/0202 |
| 2024/0385888 A1* | 11/2024 | Lee | G06F 9/5038 |
| 2025/0123902 A1* | 4/2025 | Long | G06F 9/5066 |
| 2025/0217054 A1* | 7/2025 | Kant | G06F 3/0673 |

FOREIGN PATENT DOCUMENTS

| | | | |
|---|---|---|---|
| JP | 2022122993 A | 8/2022 |
| WO | 2020062211 A1 | 4/2020 |
| WO | 2020216065 A1 | 10/2020 |

* cited by examiner

Clustering Algorithm Flow Diagram

Start

Organize Nodes Into Clusters 600

Implement Iterative Scoring Process 602

Adjust Blockchain Network's Consensus Mechanism Complexity 604

Introduce A Cooldown Period 606

Use Smart Contract As A Load Balancer 608

Reward Selected Nodes 610

Adapt Consensus Process To Network Growth 612

End

SCALABLE CLUSTER BASED SCORING WITH MULTI-QUEUE DYNAMIC SCHEDULING CONSENSUS MECHANISM IN BLOCKCHAIN

TECHNICAL FIELD

The present disclosure pertains to the implementation and optimization of consensus mechanisms in distributed ledger technologies, leveraging artificial intelligence (AI) and machine learning (ML) methodologies. Specifically, the invention focuses on a novel, AI-driven approach to enhance the efficiency, scalability, and security of blockchain networks through a cluster-based system and multi-queue dynamic scheduling mechanism. This system utilizes AI algorithms to dynamically evaluate nodes within the blockchain network based on various performance metrics and historical data, aiming to optimize the selection process for nodes participating in the consensus mechanism. The incorporation of machine learning techniques allows for the continuous improvement of evaluation criteria and queue management strategies based on network behavior and performance trends. This adaptive, intelligent framework significantly advances the state of blockchain technology, promoting a more democratic, secure, and environmentally sustainable approach to achieving consensus across distributed systems.

DESCRIPTION OF THE RELATED ART

The crux of the challenges faced by current blockchain technologies largely revolves around the mechanisms employed to achieve consensus across the network. At its core, a consensus mechanism is a system used to achieve agreement on a single data value among distributed processes or systems, which is critical in a blockchain network to validate transactions and maintain the integrity and security of the distributed ledger. However, the limitations of existing consensus mechanisms, such as Proof of Work (PoW), Proof of Stake (POS), Proof of Burn (PoB), and Proof of Activity (PoA), present significant hurdles to the scalability, efficiency, inclusivity, and environmental sustainability of blockchain technology.

Proof of Work (PoW), the first consensus mechanism introduced by Bitcoin, the original cryptocurrency, has been criticized for its immense energy consumption. PoW requires miners to solve complex mathematical puzzles in order to validate transactions and add new blocks to the blockchain. This process, often referred to as mining, demands substantial computational power, leading to a situation where only those with advanced hardware can effectively participate. This has not only led to the centralization of mining power among a small number of participants but also raised significant environmental concerns due to the high energy requirements, which often rely on non-renewable energy sources.

Proof of Stake (POS) emerged as an alternative to address some of the energy concerns associated with PoW. In PoS, the probability of validating a new block is determined by how many coins a miner holds and is willing to "stake" or lock up as security. While POS reduces the energy requirement by eliminating the need for complex computations, it introduces a different problem: wealth concentration. Essentially, those with more coins have a higher chance of being chosen to validate transactions, which can lead to a plutocracy where the rich have greater control over the network.

Proof of Burn (PoB) and Proof of Activity (PoA) offer variations in the consensus mechanism design but still come with their own sets of issues. PoB, for instance, involves miners sending coins to an unspendable address to obtain the right to mine, which, while less energy-intensive than PoW, still encourages wasteful practices by burning cryptocurrency. PoA attempts to blend POW and PoS to create a more balanced approach but can still suffer from the combined drawbacks of both systems, including energy consumption and potential for wealth concentration.

The scalability challenge is another significant issue faced by traditional blockchain consensus mechanisms. As the number of participants and transactions on a blockchain increases, these mechanisms struggle to process transactions efficiently. This can lead to slower transaction times and higher transaction amounts, making the blockchain less practical for everyday use and limiting its applicability in various sectors that could benefit from the technology. The scalability issue is a critical barrier to the mass adoption of blockchain technology.

Another pressing problem is the barrier to entry for new participants. In consensus mechanisms like PoS, a potential validator needs to already possess a certain amount of cryptocurrency. This requirement can exclude individuals and organizations that are either new to the blockchain space or do not have the initial capital to invest, further centralizing the validation process to those already within the ecosystem. This goes against the principle of decentralization, a foundational ethos of blockchain technology.

The environmental impact of blockchain technology, particularly concerning PoW-based systems, cannot be overstated. The carbon footprint associated with mining operations has come under scrutiny, as it contributes significantly to global carbon emissions. The reliance on such energy-intensive processes raises questions about the sustainability of blockchain technology, especially in an era where there is a pressing need to reduce carbon emissions and combat climate change.

Moreover, the complexity of participating in the mining or validation process can deter broader engagement with blockchain technology. The technical know-how required to set up mining operations or understand the stakes in POS systems can be a significant barrier for non-technical individuals, limiting the diversity of participants in the blockchain ecosystem and stifling innovation from a broader community.

Furthermore, the centralization of power in blockchain networks due to the concentration of mining or staking capabilities among a few entities contradicts the decentralized nature of blockchain technology. This centralization can lead to a lack of transparency and increased risk of manipulation, undermining the trust and security that are pivotal to the blockchain's value proposition.

Lastly, the rapid evolution of blockchain technology and its applications across industries demand a more flexible and adaptable consensus mechanism. The limitations of current mechanisms in addressing the needs of a diverse and growing blockchain ecosystem highlight the need for innovative solutions that can support scalability, inclusivity, and sustainability. The quest for such a solution is driven by the recognition that for blockchain technology to fulfill its transformative potential, it must overcome the fundamental challenges posed by its current consensus mechanisms.

The blockchain industry has long grappled with critical challenges that have hindered its scalability, inclusivity, and environmental sustainability, creating a pressing and unmet need for an innovative solution. Traditional consensus mechanisms, while foundational to blockchain's operation, have introduced significant barriers to entry due to their resource-intensive nature and the requirement for substantial upfront investments, either in the form of computational hardware for Proof of Work (PoW) or financial stakes for Proof of Stake (POS) and similar models. This has not only limited participation to a smaller, more affluent segment of potential users but has also raised concerns over centralization—a contradiction to the decentralized ethos blockchain technology aims to embody. Moreover, the environmental impact of energy-intensive consensus mechanisms has become increasingly untenable in the face of global climate challenges. Coupled with scalability issues that impede transaction efficiency as networks grow, there's a clear, long-felt need for a consensus mechanism that can address these multifaceted issues. The industry has been in search of an approach that can democratize participation, reduce energy consumption, enhance scalability and performance, and do so in a manner that maintains the security and integrity of the blockchain. This invention, with its scalable cluster-based scoring and multi-queue dynamic scheduling, proposes a groundbreaking solution that directly responds to these critical, long-standing challenges, paving the way for a more sustainable, inclusive, and efficient future for blockchain technology.

SUMMARY OF THE INVENTION

The invention represents a transformative approach to solving the inherent limitations of traditional blockchain consensus mechanisms. It introduces a novel framework designed to enhance inclusivity, efficiency, scalability, and environmental sustainability within the blockchain ecosystem. By addressing the fundamental challenges associated with mechanisms like Proof of Work (POW) and Proof of Stake (PoS), this invention paves the way for a more democratic, secure, and accessible blockchain network, crucial for the technology's broader adoption and effectiveness.

At the core of this invention lies the innovative concept of a cluster-based scoring system, integrated with a multi-queue dynamic scheduling mechanism. This design shifts away from the resource-intensive and financially exclusive models of consensus, such as those requiring significant computational power or substantial cryptocurrency holdings for participation. Instead, it adopts a more inclusive approach, allowing nodes to participate in the consensus process based on merit determined through an iterative scoring mechanism within clusters of nodes. This method democratizes the blockchain, opening up participation to a broader spectrum of users.

In the proposed technical solution, nodes within the blockchain are grouped into clusters, where they are scored based on specific criteria reflective of their contribution and reliability. Following this scoring process, nodes are placed into multiple queues, with their position determined by their score. This multi-queue system is crucial for managing the participation of nodes in the consensus process, ensuring a balanced and fair approach to selecting which nodes will validate transactions and forge new blocks.

A component of this invention is the dynamic scheduling mechanism that operates across the multiple queues. This mechanism, powered by a load balancer, systematically selects nodes from the queues for participation in the consensus process. The selection is not purely deterministic but includes a randomized element to prevent predictability and potential manipulation. This randomness ensures the decentralization of the consensus process, a core principle of blockchain technology, preventing any single node or group of nodes from dominating the blockchain validation process.

Another remarkable feature of this invention is its adaptability and scalability. As the blockchain network grows in size and transaction volume, the consensus mechanism dynamically adjusts to maintain efficiency and performance. This addresses a critical limitation of traditional consensus mechanisms, which often struggle with scalability and can become bottlenecks as the network expands. Moreover, the introduction of cooldown periods after a node has participated in forging a block ensures a fair rotation among nodes, preventing monopolization of the consensus process and enhancing the network's security.

The primary features of this invention encompass decentralized selection of mining nodes through cluster-based iterative scoring within a multi-queue consensus mechanism. This unique setup not only facilitates a fair and efficient process but also lowers the entry barriers for participation in the blockchain. Additionally, the system's design inherently supports scalability by adjusting the mining and forging complexity as the network evolves, ensuring that the blockchain remains accessible and manageable even as it grows.

More specifically, the invention introduces a groundbreaking method for selecting mining nodes within a blockchain network, employing a decentralized, cluster-based iterative scoring system integrated into a multi-queue consensus mechanism. This approach marks a significant departure from traditional, centralized selection methods, promoting a fairer and more distributed process. Nodes are organized into clusters, where they undergo a scoring process based on their performance and reliability. This scoring is not arbitrary but follows a defined iterative mechanism, ensuring transparency and objectivity. Each node within a cluster receives a score from other nodes, except for itself, fostering a community-based evaluation system that rewards cooperation and contribution.

As the blockchain network commences, the mining complexity faced by the initial selected nodes is notably high. This initial complexity serves as a mechanism to ensure that only the most capable nodes participate in the early stages of the blockchain's development. However, as the blockchain matures and the number of transactions and nodes increases, the system dynamically adjusts the mining complexity. This reduction in complexity facilitates a transition from a mining-centric approach to a forging-centric one, allowing for a broader participation base and reducing the energy consumption typically associated with high mining complexity.

A unique aspect of this invention is the opportunity it provides for every node to participate in the block forging process. Once a node is selected from a queue to forge a block, it must undergo a mandatory cooling period before it can rejoin the queue for another opportunity. This cooling period is crucial for preventing any single node from dominating the forging process, thereby maintaining the network's decentralized nature and ensuring fair access to forging opportunities for all nodes.

The cluster-based scoring mechanism plays a pivotal role in the node selection process. Within each cluster, nodes are evaluated and scored based on predefined criteria, with each node in a cluster having the opportunity to score others. The scoring formula, $n-2$, where $n$ represents the total number of nodes in a cluster, ensures that every node has a say in the evaluation process, excluding self-nominations. This method encourages a participatory evaluation system, where nodes are motivated to perform well and contribute positively to the network to receive high scores from their peers.

Upon completing the scoring process, the node with the highest score in each cluster is granted a chance to join one of several queues. These queues are central to the dynamic scheduling mechanism of the consensus process. The selection of a queue, and consequently the nodes within it for participation in the forging process, is determined by a random selection algorithm. This algorithm takes into account the weight of each queue, which is influenced by various factors including the scores of the nodes within it, ensuring that the selection process remains fair and unpredictable.

Lastly, the nodes that successfully forge a block are rewarded with the transaction amounts associated with that block. This incentivization mechanism ensures that nodes are motivated to participate actively in the forging process, contributing to the overall health and security of the blockchain network. This approach not only incentivizes participation but also ensures that the rewards are distributed in a manner that reflects the contribution of each node to the network's operations.

Through these innovative mechanisms, the invention revolutionizes the consensus process within blockchain technology, offering a more equitable, efficient, and sustainable method for node selection and participation. This detailed framework ensures that every node, regardless of its initial resources, has the opportunity to contribute to and benefit from the network, marking a significant step forward in the democratization of blockchain technology.

The invention revolutionizes the blockchain consensus process through a decentralized selection mechanism that employs a cluster-based iterative scoring within a multi-queue system. This innovative approach dismantles the conventional reliance on resource-intensive methods for mining or forging within the blockchain. As the blockchain network expands and matures, the mechanism dynamically adjusts the complexity associated with mining or forging activities. This adaptive complexity ensures that the blockchain transitions from requiring high-resource input in its early stages to more sustainable, less resource-intensive operations. Such an evolution allows for the application of a singular, unified consensus mechanism across the entirety of the blockchain's lifespan, significantly enhancing efficiency and inclusivity.

The formation of clusters, a core element of this method, is ingeniously based on the "closeness" property, determining the proximity of nodes to the blockchain's most recent block all the way back to its genesis block. This spatial arrangement facilitates a more organized and strategic approach to node selection, ensuring that those nodes with the most relevant and recent activity are prioritized for selection. It's a method that not only streamlines the consensus process but also fortifies the blockchain's integrity by leveraging the most actively participating nodes.

Nodes that find themselves outside of these initial clusters are not sidelined; instead, they are given a unique opportunity to engage directly in the final round of scoring. Here, they compete alongside the winners from the various clusters, ensuring every participant in the network has a chance to contribute to the blockchain's growth and security. This inclusive approach democratizes participation, allowing for a broader array of nodes to influence the blockchain's evolution and maintenance.

The deployment of dynamic queue prioritization is another cornerstone of this invention. Through a queue weight-based random selection algorithm, nodes are dynamically selected for participation in the consensus process. This method introduces an element of unpredictability and fairness to the selection process, effectively decentralizing node selection and ensuring that no single node or group of nodes can dominate the blockchain. This randomness maintains the blockchain's foundational principle of decentralization, enhancing the system's security and resilience against potential manipulations or attacks.

A novel introduction within this framework is the cooldown period, strategically implemented to prevent a node from rejoining the queue immediately after forging a block. This cooldown serves as a regulatory mechanism, ensuring that the opportunity to participate in the forging process is evenly distributed among nodes. It prevents the monopolization of the forging process by any single node, promoting a fair and equitable environment for all participants. This cooldown period is pivotal in maintaining the integrity and democratization of the blockchain, ensuring that the network remains secure, efficient, and inclusive.

Together, these features coalesce into a groundbreaking consensus mechanism that addresses and overcomes the limitations of traditional blockchain technologies. By fostering a more inclusive, efficient, and sustainable blockchain environment, this invention lays the groundwork for the next generation of blockchain innovations, ensuring that the technology remains adaptable and accessible to a wide range of participants.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a method for selecting nodes within a blockchain network for participation in a consensus mechanism involves several key steps aimed at creating a fair, efficient, and scalable system. Initially, the nodes within the blockchain network are organized into clusters. This organization is based on a closeness property, which evaluates each node's proximity to the blockchain's progression from its genesis block to the current block. Following this, a cluster size, predetermined by the network, is assigned. This step involves grouping nodes that have expressed a desire to participate in the consensus mechanism into clusters of up to the defined size. Any nodes that do not fit into these clusters due to size constraints are then directly moved to a final round of scoring, ensuring that every node has an opportunity to be evaluated for participation.

An iterative scoring process is implemented within each cluster to further refine the selection process. In this step, each node is evaluated based on predefined criteria, with the provision that nodes cannot score themselves. This results in the selection of a winning node from each cluster, determined by the cumulative scores received from their peer nodes within the same cluster. The system then dynamically adjusts the mining or forging complexity associated with the blockchain network's consensus mechanism. This adjustment is based on the network's size and transaction volume, allowing for a seamless transition from a high-complexity, mining-centric approach to a lower-complexity, forging-centric approach, thereby maintaining the system's scalability and efficiency.

To ensure fairness and an equitable opportunity for all nodes to contribute to the blockchain network, a cooldown period is introduced after a node's participation in the consensus mechanism. This cooldown period prevents nodes from dominating the consensus process by requiring a mandatory wait before they can participate again. Finally, the system employs a smart contract functioning as a load balancer. This smart contract is responsible for distributing the winning nodes across multiple queues. Each queue has a randomized chance of being selected for the consensus process participation, based on a weighted algorithm. This ensures decentralized and fair participation across the blockchain network, promoting an inclusive and balanced consensus mechanism.

In some arrangements, the method for selecting nodes within a blockchain network for their participation in a consensus mechanism includes an intricate process that ensures fairness, efficiency, and adaptability. At the core of this process is the organization of nodes into clusters based on a closeness property. This property assesses the spatial arrangement of nodes in relation to the blockchain's most recent block, extending back to the genesis block, to prioritize nodes for participation.

In instances where nodes are not initially selected for any cluster, the method offers these nodes a unique opportunity. They are allowed to compete directly in the final round of scoring alongside the winners from the initial clusters, ensuring every node has a fair chance at participation regardless of initial clustering outcomes.

The selection process is further refined through the implementation of a multi-queue system. In this system, winning nodes are assigned to different queues, and their participation in the next round of the consensus mechanism is determined by a random selection algorithm. This algorithm assigns priority to queues based on a queue weight, which factors in the queue nonce, the number of nodes within the queue, and the frequency of the queue being selected. The queue nonce, crucially, is a randomly assigned decimal value ranging between 0 and 1, assigned at the queue's creation, adding an element of unpredictability to the queue selection process.

An iterative scoring process is employed within each cluster to determine the winning nodes. This process allows each node within a cluster to assign scores to other nodes, with the stipulation that they cannot score themselves, using a formula where the available scores equal the total number of nodes in the cluster minus two. This ensures a democratic and equitable evaluation among peers. Furthermore, to add dynamism to the process, nodes are permitted to assign multiple scores to a single node, thereby influencing the node's ranking within the selection process significantly.

Upon successful participation in the consensus mechanism and the forging of a block, selected nodes from each queue are rewarded with the transaction amounts associated with that block. This acts as an incentive for participation, encouraging nodes to remain active and engaged in the consensus process.

The system is designed with adaptability in mind, capable of accommodating the blockchain network's growth. It includes mechanisms to scale the consensus process accordingly, ensuring the maintenance of efficiency, security, and fairness for all participating nodes. This adaptability ensures the long-term viability of the blockchain network's consensus mechanism, allowing it to evolve in response to changing needs and conditions.

In some arrangements, the method for selecting nodes within a blockchain network to participate in a consensus mechanism is a comprehensive approach designed to ensure fairness, efficiency, and adaptability across the network. It begins by organizing the nodes into clusters. This organization process involves traversing the blockchain from the most recent block back to the genesis block, employing a closeness property to evaluate and group nodes based on their expressed desire to participate in the consensus mechanism. Clusters are formed based on a predetermined size defined by the network. Any nodes that do not fit within these clusters due to numerical constraints are directly advanced to a final round of scoring, ensuring that no node is left without the opportunity to participate.

Within each cluster, an iterative scoring process is implemented, where each node is evaluated by its peers based on predefined criteria. Importantly, nodes are not allowed to score themselves, promoting an unbiased selection process. The scoring formula dictates that the number of scores a node can assign is equal to the total number of nodes in the cluster minus two, facilitating the selection of a winning node from each cluster based on the highest cumulative scores received. Furthermore, this process allows for the possibility of a node assigning multiple scores to a single peer, introducing a dynamic element that can significantly influence a node's ranking within its cluster.

As the network evolves in size and transaction volume, the complexity associated with the blockchain's consensus mechanism is dynamically adjusted. This ensures a smooth transition from a high-complexity, mining-centric approach to a more efficient, lower-complexity forging-centric approach, thereby maintaining the scalability and operational efficiency of the network.

Following a node's participation in the consensus mechanism, a cooldown period is introduced. This cooldown period is designed to ensure a fair rotation and equitable opportunity for all nodes wishing to contribute to the blockchain network, effectively preventing any single node from dominating the consensus process.

A smart contract functions as a load balancer, distributing winning nodes across multiple queues. Each queue is given a chance to be selected for participation in the consensus process, based on a randomized selection algorithm that prioritizes queues according to a weight calculation. This calculation is derived from a randomly assigned queue nonce, the number of nodes within the queue, and the frequency of the queue's selection, ensuring decentralized and equitable participation.

Selected nodes from each queue, upon successfully forging a block, are rewarded with the transaction adddd associated with that block. This incentive is designed to promote active and continuous engagement within the consensus mechanism.

Finally, the method includes adapting the consensus process to the growth of the blockchain network. This adaptation involves employing mechanisms that scale the process and maintain efficiency, security, and fairness across all participating nodes. Such measures ensure the long-term viability and robustness of the system, allowing it to evolve alongside the blockchain network it supports.

In some arrangements, in enhancing the method for selecting nodes within a blockchain network to participate in a consensus mechanism, the closeness property used for organizing nodes into clusters is refined to assess the chronological order of node activity. This assessment gives preference to nodes with the most recent interactions with the blockchain, thereby ensuring that the most active participants are prioritized in the consensus mechanism. To add depth to the iterative scoring process, peer review sessions are introduced among nodes within the same cluster. These sessions allow nodes to justify the scores they assign to their peers based on transaction history and contributions, thereby integrating a qualitative assessment into the scoring mechanism.

To ensure the dynamic adjustment of complexity in the consensus mechanism accurately reflects the state of the network, an algorithm is employed. This algorithm takes into account past transaction volumes, network participation rates, and the average time taken for a block to be forged, making the adjustment in complexity both predictive of future needs and reflective of actual network conditions. Following a node's participation in the consensus mechanism, the cooldown period before they can participate again is carefully determined based on the node's historical activity. This approach subjects more active nodes to shorter cooldown periods, effectively rewarding consistent contributors with more frequent opportunities to participate and thereby promoting sustained engagement with the network.

Furthermore, the smart contract that functions as a load balancer is enhanced with an audit mechanism. This mechanism regularly evaluates the fairness and efficiency of how queues are selected for participation in the consensus process. By adjusting queue weights based on historical selection biases, the audit mechanism aims to ensure long-term decentralization and equitable participation among nodes. This series of enhancements to the node selection method underscores a commitment to fairness, active participation, and adaptability to the evolving needs of the blockchain network.

In some arrangements, a blockchain network consensus system is designed with several key components to ensure an efficient, fair, and scalable process for node participation. At its core, the system features a node organization module. This module is adept at navigating the blockchain from the current block back to the genesis block, leveraging a closeness property to sequence node interactions. This sequencing prioritizes nodes based on their recent activity, groups them into clusters of a predefined size set by the network for structured consensus involvement, and advances nodes not fitting into these clusters due to numerical limits to a final scoring round. This ensures every node has the opportunity to participate in the consensus mechanism, promoting inclusivity.

Embedded within this node organization module is an iterative scoring mechanism. It enables peer nodes within each cluster to evaluate one another against well-defined criteria that eliminate the possibility of self-assessment. The scoring system employed allows a node to distribute scores equal to the number of nodes in the cluster minus two. This system facilitates the equitable selection of a winning node based on the cumulative evaluations received from peers and allows for the dynamic allocation of multiple scores to a single peer, thus adding depth to the intra-cluster ranking process.

A dynamic complexity adjustment mechanism is integral to the system. It recalibrates the consensus mechanism's complexity from a high-demand, mining-centric approach to a more sustainable, lower-complexity, forging-centric approach. This adjustment responds in real-time to changes in network size and transactional activity, ensuring the system remains scalable and operationally efficient.

The cooldown management system is another component. It imposes mandatory wait periods on nodes after they participate in the consensus mechanism. The length of these wait periods is based on the nodes' previous engagement and contributions to the blockchain, democratizing the opportunity for subsequent participation and preventing any single node from dominating the process.

Additionally, the system incorporates a decentralized selection module. This module includes a smart contract acting as a load balancer to fairly distribute victors from the scoring mechanism across various queues. The selection of nodes for consensus roles within these queues is determined by a weighted randomization algorithm. This algorithm takes into account a queue nonce—a decimal value randomly assigned at the queue's creation—alongside the queue's node density and historical selection frequency, ensuring an equitable and decentralized engagement of nodes.

Integrated within the decentralized selection module is a reward distribution system. It is tasked with allocating the transaction amounts collected from successfully forged blocks to the nodes selected for consensus roles, serving as an incentive for ongoing and active participation in the system.

Finally, an adaptability and fairness enhancement module is included in the system. It is responsible for the real-time adjustment of the consensus process, aligning it with the growth trajectory of the blockchain network. By employing scalable strategies, this module ensures the preservation of efficiency, the security of the network, and the upholding of fairness across the ecosystem of participating nodes, solidifying the system's robustness and long-term viability.

In some arrangements, within the blockchain network consensus system, the method for organizing nodes incorporates a refined approach in its closeness property. This refined approach includes an in-depth analysis of the transaction volume and the frequency of each node's participation in the consensus mechanism over a set period. By doing so, the system enhances the prioritization process for node grouping into clusters. This ensures that nodes making significant contributions to the blockchain's activity are recognized and given precedence in the participation process of the consensus mechanism, fostering a more engaged and active blockchain community.

Furthermore, the system includes an enhancement to the iterative scoring mechanism. This enhancement broadens the predefined criteria used for node evaluation to encompass a review of each node's historical accuracy in transaction verification and its computational contributions to the network. By integrating these factors into the scoring process, the system aims to foster a higher quality of consensus. This approach rewards nodes that demonstrate consistent reliability and substantial support to the network's operations, thereby encouraging nodes to maintain high standards of performance and accuracy in their contributions.

Additionally, the dynamic complexity adjustment mechanism within the system is engineered to automatically update the consensus mechanism's complexity threshold. This update occurs in real-time and is based on an algorithmic assessment of network congestion levels, transaction pending times, and overall blockchain scalability metrics. Such a configuration ensures that the blockchain network maintains optimal efficiency and responsiveness to fluctuating operational demands. This adaptability allows the blockchain to scale effectively, accommodating growth and increasing transaction volumes without compromising the speed or integrity of the consensus process.

The following description and the appended claims, with reference to the accompanying drawings, which all form a part of this specification and where like reference numerals designate corresponding parts in the various figures, will make these and other features and characteristics of the current technology, as well as the methods of operation and functions of the related elements of structure and the combination of parts and economies of manufacture, more apparent. As computer-executable instructions (or as computer modules or in other computer constructs) recorded on computer-readable media, one or more of the different procedures or processes described herein may be implemented in whole or in part. Steps and functionality might be carried out on a single machine or dispersed over several devices that are connected to one another. However, it is clearly recognized that the drawings are meant primarily for descriptive and illustrative purposes and are not meant to define the boundaries of the invention. Unless the context makes it obvious otherwise, the single forms of "a," "an," and "the" as they appear in the specification and claims include plural referents.

DETAILED DESCRIPTION

Figure 1:
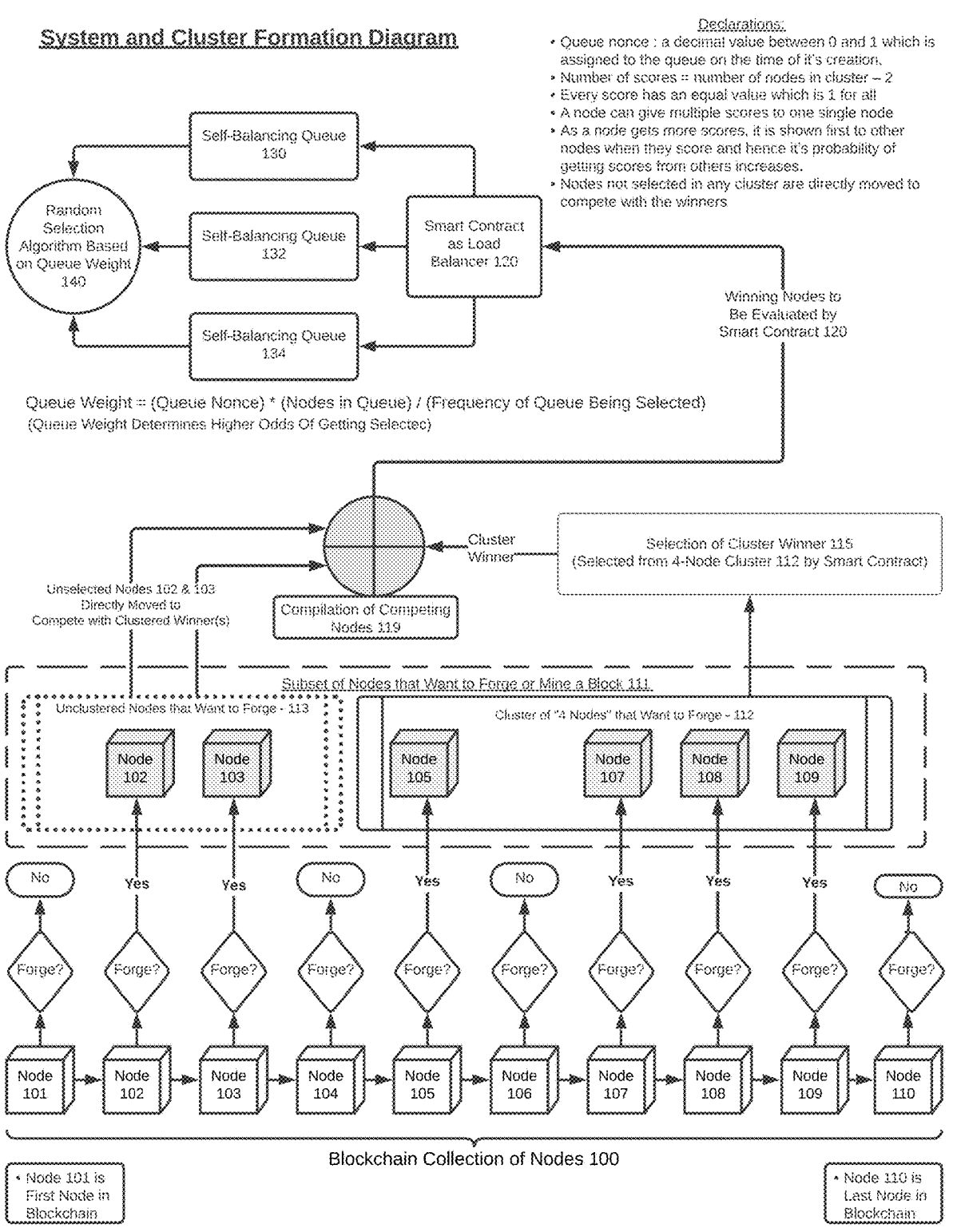
FIG. 1 illustrates a system and cluster formation diagram, showcasing the mechanism for scoring nodes within a blockchain cluster based on a self-balancing queue and the interaction of nodes with a smart contract as a load balancer. It details the process of node selection and placement into clusters, highlighting how nodes not selected are moved directly to compete with clustered winners, emphasizing the dynamic and democratic nature of node participation in the blockchain consensus process.

At a high level, the invention disclosed herein is a novel approach to address the challenges faced by traditional blockchain consensus mechanisms, focusing on inclusivity, efficiency, scalability, and environmental sustainability. By redefining the process of node selection and participation in the blockchain, this system introduces a cluster-based scoring system paired with a multi-queue dynamic scheduling mechanism. These core inventive features mark a departure from resource-intensive models such as Proof of Work (POW) and Proof of Stake (POS), aiming to democratize blockchain technology by allowing broader user participation based on merit.

Central to the invention is the concept of grouping nodes within the blockchain into clusters. Within these clusters, nodes are scored based on predefined criteria that reflect their contribution and reliability. This scoring process is iterative, with each node receiving scores from others in the cluster, excluding itself, fostering a community-based evaluation. Following this, nodes are placed into multiple queues based on their scores. This multi-queue system is integral to the dynamic scheduling mechanism that selects nodes for participation in the consensus process, ensuring a balanced and fair approach to validating transactions and forging new blocks.

A distinctive feature of this invention is the adaptability and scalability of the consensus mechanism. As the blockchain network grows, the system dynamically adjusts to maintain efficiency and performance. This is particularly important for addressing traditional consensus mechanisms' struggles with scalability, which can become bottlenecks as the network expands. Additionally, the introduction of cooldown periods after a node has participated in forging a block ensures fair rotation among nodes, preventing monopolization of the consensus process and enhancing network security.

The primary features of this invention include the decentralized selection of mining nodes through a cluster-based iterative scoring system within a multi-queue consensus mechanism. This setup facilitates a fair and efficient process, lowers entry barriers for participation, and inherently supports scalability by adjusting mining and forging complexity as the network evolves. This ensures that the blockchain remains accessible and manageable even as it grows.

Further innovation is evident in the method for selecting mining nodes, employing a decentralized cluster-based iterative scoring system integrated into a multi-queue consensus mechanism. This method marks a significant departure from traditional centralized selection methods, promoting a fairer and more distributed process. The scoring process within clusters ensures transparency and objectivity, encouraging a participatory evaluation system where nodes are motivated to perform well and contribute positively to the network.

As the blockchain network commences, the mining complexity faced by the initial selected nodes is high, ensuring only the most capable nodes participate early on. However, as the network matures, the system dynamically adjusts the mining complexity, facilitating a transition from a mining-centric to a forging-centric approach. This reduces the energy consumption typically associated with high mining complexity and allows for broader participation.

The invention also introduces a novel opportunity for every node to participate in the block forging process, with mandatory cooling periods ensuring no single node dominates the forging process. This maintains the network's decentralized nature and ensures fair access to forging opportunities for all nodes. The dynamic scheduling mechanism, through a random selection algorithm considering queue weight, adds an unpredictability element to the selection process, further decentralizing node selection and enhancing system security.

Overall, this invention revolutionizes the blockchain consensus process by introducing a decentralized, efficient, and scalable solution that addresses the limitations of traditional technologies. By fostering a more inclusive, efficient, and sustainable blockchain environment, this system lays the groundwork for the next generation of blockchain innovations, ensuring the technology remains adaptable and accessible to a wide range of participants.

The following account of various example embodiments is designed to fulfill the objectives mentioned earlier, with reference to the accompanying illustrations that are relevant to this disclosure. These illustrations demonstrate multiple systems and methods for implementing the disclosed information. It is important to acknowledge that there are alternative implementations possible, and adjustments to both structure and functionality can be applied. The description outlines various links between elements, which are to be interpreted broadly. Unless specified otherwise, these connections can be either direct or indirect, and may be established through wired or wireless means. This document does not intend to limit the nature of these connections.

Terms like "computers," "machines," and similar phrases are interchangeably used herein, depending on the context, to refer to devices that can be general-purpose or specialized, designed for particular functions, either virtual or physical, or capable of connecting to networks. This includes all relevant hardware, software, and components familiar to those with expertise in the area. Such devices may be outfitted with specialized circuits like application-specific integrated circuits (ASICs), microprocessors, cores, or other processing units to execute, access, control, or implement various types of software, instructions, data, modules, processes, or routines as mentioned. The usage of these terms in the text is not intended to be limiting or exclusive to any specific kinds of electronic devices or components and should be interpreted in the widest sense by those with relevant expertise. Specific details on computer/ software components, machines, etc., are not provided for the sake of brevity and under the assumption that such information is within the realm of understanding of skilled professionals in the domain.

Software, executable code, data, modules, procedures, and similar components can be housed on tangible, computer-readable physical storage devices. This encompasses everything from local memory and network-attached storage to diverse forms of memory that are accessible, whether they are removable, remote, cloud-based, or available via other channels. These components can be saved on both volatile and non-volatile memory and might operate under various conditions, including autonomously, upon request, according to a predetermined schedule, spontaneously, proactively, or in response to specific triggers. They can be stored together or distributed among several computers or devices, incorporating their memory and other parts. Moreover, these components can be housed or disseminated across network-accessible storage systems, within distributed databases, big data frameworks, blockchains, or distributed ledger technologies, either collectively or through distributed arrangements.

The phrase "networks" or similar terms refer to a broad range of communication systems, such as local area networks (LANs), wide area networks (WANs), the Internet, cloud-based networks, and both wired and wireless networks. This category also includes specialized networks like digital subscriber line (DSL) networks, frame relay networks, asynchronous transfer mode (ATM) networks, and virtual private networks (VPN), which may be interconnected in various ways. Networks are designed with specific interfaces to support different types of communications—internal, external, and managerial—with the capability to allocate virtual IP addresses (VIPs) to these interfaces as necessary. The architecture of a network is built upon an array of hardware and software elements. This includes, but is not limited to, access points, network adapters, buses, both wired and wireless ethernet adapters, firewalls, hubs, modems, routers, and switches, which may be positioned within the network, on its periphery, or outside. Software and executable instructions work on these components to enable network operations. Additionally, networks support HTTPS and a variety of other communication protocols, making them suitable for packet-based data transmission and communication.

As used herein, Generative Artificial Intelligence (AI) or the like refers to AI techniques that learn from a representation of training data and use it to generate new content that is similar to or inspired by existing data. Generated content may include human-like outputs such as natural language text, source code, images/videos, and audio samples. Generative AI solutions typically leverage open-source or vendor sourced (proprietary) models, and can be provisioned in a variety of ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used in accordance with various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models—Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in the field of biology and medicine. (5) NVIDIA AI Models-Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in the field of generative AI. One or more of the foregoing may be used herein as desired. All are considered to be within the sphere and scope of this disclosure.

Generative AI and LLMs can be used in various aspects of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and utilizing large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

By way of non-limiting disclosure, FIG. 1 maps out the operational framework of a blockchain network's system and cluster formation, utilizing a variety of elements meticulously numbered to illustrate the specific functions and interactions that underpin this innovative blockchain consensus mechanism. This figure illustrates how individual nodes are evaluated, organized, and ultimately selected to participate in the blockchain's consensus process, ensuring a transparent, efficient, and democratic system.

The diagram starts with the Blockchain Collection of Nodes (100), representing the totality of nodes within the blockchain network. Each node, numbered from Node 101 to Node 110, symbolizes individual participants in the blockchain, highlighting the network's distributed nature. Notably, Node 101 is identified as the First Node in the Blockchain, and Node 110 as the Last Node, establishing the chronological and functional span of the blockchain's architecture.

Central to FIG. 1 is the Self-Balancing Queue (130, 132, 134), a mechanism that dynamically adjusts the position of nodes based on their interactions and performance within the network. The Queue Nonce and Queue Weight calculations play a pivotal role here, determining the likelihood of a node's selection for consensus participation. This system ensures that the process remains fair and balanced, promoting an equitable opportunity for all nodes to contribute to the network's maintenance and security.

The Smart Contract as Load Balancer (140) is another crucial element, acting as an arbiter that evaluates and selects winning nodes to be evaluated (120) based on predefined criteria. This evaluation process is integral to maintaining the blockchain's integrity, as it ensures that only the most suitable nodes are chosen for forging new blocks, based on their reliability and contribution to the network.

Unselected Nodes (102 & 103) directly moved to compete with Clustered Winner(s) emphasizes the system's inclusivity, ensuring that nodes not initially chosen in any cluster still have an opportunity to participate in the consensus process. This approach maximizes participation and engagement across the network, reinforcing the decentralized and democratic ethos of the blockchain technology.

The Compilation of Competing Nodes (119) and the Selection of Cluster Winner (115) processes, involving nodes from a Subset of Nodes that Want to Forge or Mine a Block (111) and specifically from a Cluster of "4 Nodes" that Want to Forge (112) (i.e., wherein a cluster size of 4 has been selected merely for example purposes), showcase the methodical selection and evaluation process within the clustered environment. The diagram illustrates how nodes are scored and selected, with the ultimate goal of choosing a Cluster Winner who will participate in the blockchain's consensus mechanism.

In summary, FIG. 1 is a comprehensive illustration of the system and cluster formation in this blockchain innovation, detailing the intricate processes and mechanisms—such as self-balancing queues, smart contracts as load balancers, and dynamic node selection and scoring—that enable a fair, efficient, and scalable consensus mechanism. This detailed depiction underscores the novel approach to blockchain consensus, moving beyond traditional, resource-intensive methods to a more inclusive, democratic, and environmentally sustainable model.

Figure 2:
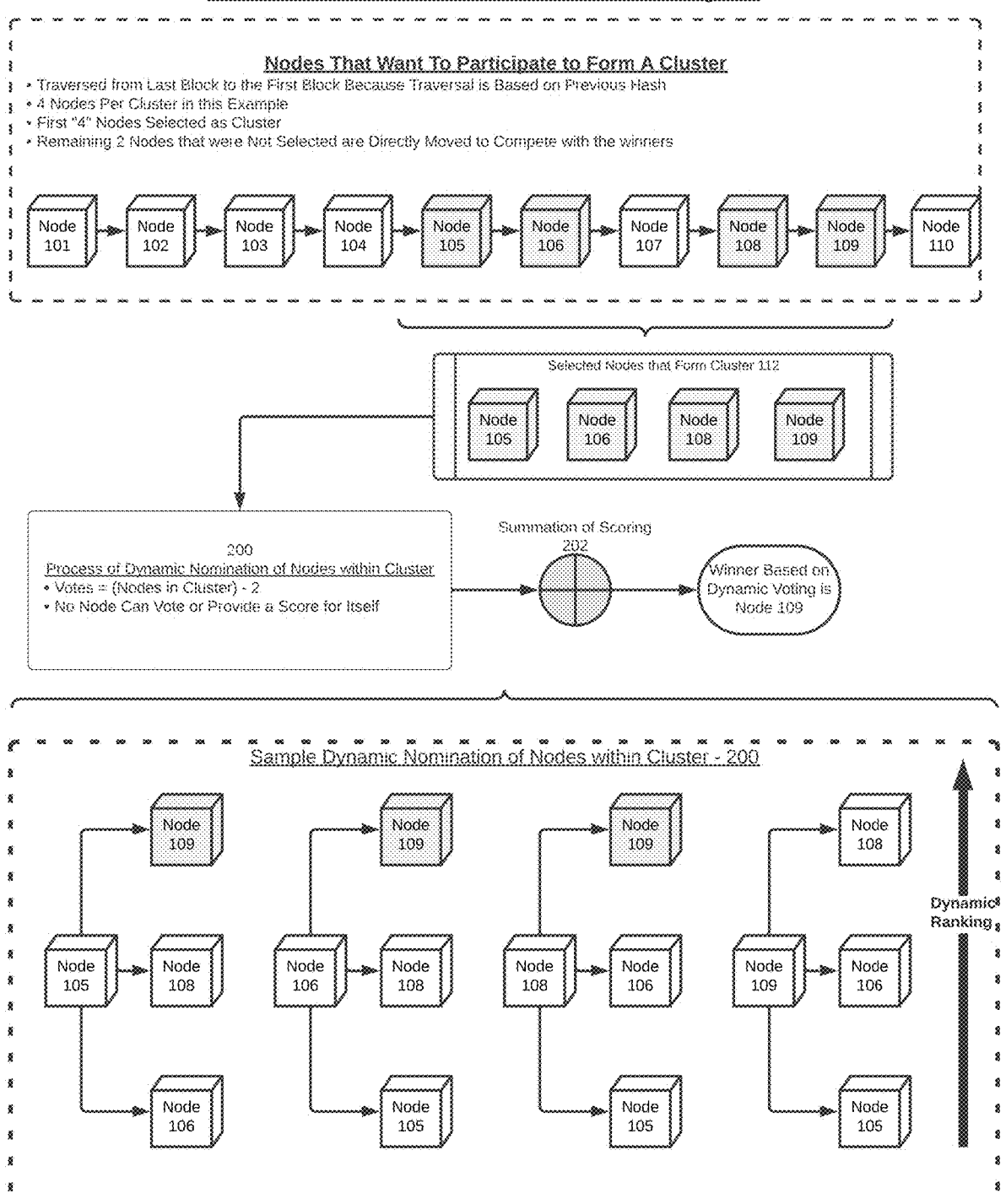
FIG. 2 depicts a cluster formation and node nomination diagram, illustrating the dynamic nomination process among nodes within a cluster to select a winner based on the scoring from other nodes. It showcases the procedure where nodes are grouped into clusters, with each node having the opportunity to score others, leading to the selection of a winning node based on the cumulative scores received, highlighting the decentralized and participatory nature of the scoring and selection process in the blockchain network.

By way of non-limiting disclosure, FIG. 2 offers an in-depth look into the intricate cluster formation and dynamic nomination process pivotal to the blockchain network's consensus mechanism. It visualizes a detailed sequence of actions, interactions, and evaluations amongst nodes, elucidating a democratic and inclusive method for consensus through a participatory nomination system within node clusters. This figure is instrumental in demonstrating the novel approach to consensus, emphasizing the mechanism's fairness, transparency, and collaborative essence.

Nodes That Want To Participate to Form A Cluster: This segment of the diagram outlines the initial stage where nodes express their intent to participate in the consensus process. All nodes, labeled from Node 101 to Node 110, signify the broad inclusivity of the system, allowing every node within the network the opportunity to be part of a cluster, regardless of their position or past contributions. This inclusivity underpins the blockchain's democratic ethos, ensuring that all participants have an equitable chance to contribute to the consensus mechanism.

Selected Nodes that Form Cluster 112: Here, specific nodes (Node 105, Node 106, Node 108, and Node 109) are highlighted as being selected to form a cluster, a crucial step in the blockchain's consensus process. This selection process is based on predefined criteria, such as the nodes' willingness and readiness to participate, as well as their specific characteristics or contributions to the blockchain. The formation of such clusters is a strategic step towards organizing the network's nodes into manageable groups for more efficient and effective consensus nomination.

Process of Dynamic Nomination of Nodes within Cluster (200): This process is at the core of the democratic and decentralized decision-making mechanism of the blockchain. It illustrates how nominations are allocated within the cluster, with the rule that nominations equal the number of nodes in the cluster minus two. This ensures a fair nomination process by preventing any node from nomination for itself, thereby promoting an unbiased and equitable evaluation of each node's contribution and suitability for being selected as the cluster winner.

Sample Dynamic Nomination of Nodes within Cluster (200): Delving deeper into the nomination mechanics, this part of the diagram showcases the actual nomination interactions among the nodes within a cluster. Each node's nomination is represented, illustrating the participatory nature of the process where every node has a voice in determining the cluster's winner. This detailed depiction of the nomination process emphasizes the system's commitment to a transparent and collective decision-making process, where the outcome is directly influenced by the consensus of the cluster's participants.

Summation of Scoring (202) and Winner Based on Dynamic Nomination is Node 109: The culmination of the dynamic nomination process is captured in this segment, where Node 109 is identified as the winner of the cluster based on the highest cumulative score from the nominations. This result demonstrates the effectiveness and fairness of the dynamic nomination process, where the collective judgment of the cluster's nodes determines the winner. The selection of Node 109 highlights the system's ability to recognize and reward nodes based on their merit and the consensus of their peers, reinforcing the blockchain's decentralized and democratic principles.

In summary, FIG. 2 intricately details the process from the expression of intent by nodes to participate in the blockchain consensus, through the formation of clusters, to the dynamic nomination process that determines the cluster winner. This detailed walkthrough of the cluster formation and nomination process underscores the blockchain mechanism's innovative approach to achieving a democratic, transparent, and fair consensus, illustrating the fundamental shift towards a more inclusive and collaborative blockchain network.

Figure 3:
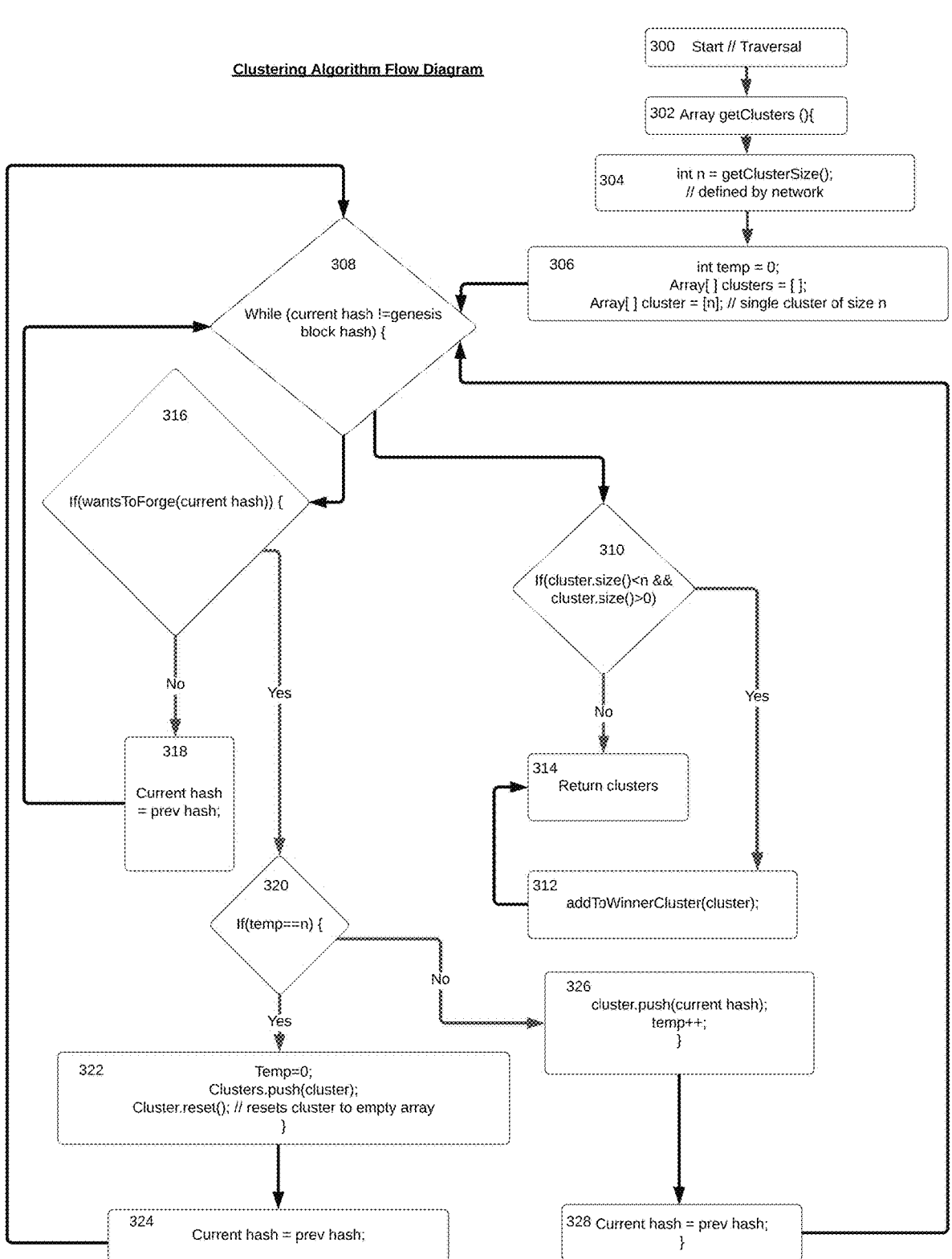
FIG. 3 presents a clustering algorithm flow diagram, demonstrating the methodical traversal and selection of blockchain nodes to form clusters based on their desire to participate in forging or mining a block. This diagram outlines the process from starting traversal to dynamically creating clusters of nodes that wish to forge, ensuring an organized and efficient approach to determining which nodes participate in the blockchain consensus mechanism.

By way of non-limiting disclosure, FIG. 3 shows a flow diagram for a sample clustering algorithm. The depicted clustering algorithm can be conceptualized with the following pseudocode structure:

```
// Traversal (Step 300)
Array getClusters( ){ // (Step 302)
    int n = getClusterSize( ); //defined by the network (Step 304)
    int temp = 0; // (Step 306)
    Array[ ] clusters = [ ]; // (Step 306)
    Array[ ] cluster = [n]; //single cluster of size n (Step 306)
    While(current hash !=genesis block hash){ // (Step 308)
        If(wantsToForge(current hash) ){ // (Step 316)
            If(temp==n){ // (Step 320)
                Temp = 0; // (Step 322)
                Clusters.push(cluster); // (Step 322)
                Cluster.reset( ); // resets cluster to empty array (Step 322)
            }
            cluster.push(current hash); // (Step 326)
            temp++; // (Step 326)
        }
        Current hash = prev hash; // (Step 328)
    }
    If(cluster.size( )<n && cluster.size( )>0){ // (Step 310)
        addToWinnerCluster(cluster); //adds items to final winner cluster
        (Step 312)
    }
Return clusters // (Step 314)
}
```

As illustrated in FIG. 3 and the above pseudocode, a function called getClusters( ) aims to group nodes into clusters based on their willingness to participate in the blockchain consensus process, specifically for those nodes that want to forge (create) new blocks.

The function begins by determining the size of a cluster, denoted by n, which is a value defined by the network. This size indicates how many nodes will be grouped together in a single cluster.

It initializes two main variables: temp, which is set to 0 and will be used to keep track of how many nodes have been added to the current cluster, and clusters, an array that will store all the clusters formed during this process.

Additionally, it creates an array named cluster to hold the nodes of the current cluster being formed. This array is initialized with a size of n, indicating it will hold as many nodes as the cluster size defined by the network.

The function then enters a loop that continues as long as the current node (identified by its hash) is not the genesis block, which is the very first block in the blockchain. The loop checks if the current node wants to participate in the forging process:

a. If the current node is willing to forge and the temp counter has reached the size n, it means the current cluster is full. The full cluster is then added to the clusters array, and the cluster array is reset to start forming a new cluster, with the temp counter reset to 0.

b. If the cluster is not yet full (temp is less than n), the current node's hash is added to the cluster, and the temp counter is incremented by 1, indicating another node has been added to the cluster.

After each iteration, the function updates the current node to the previous one in the blockchain, moving backward through the blockchain from the current position towards the genesis block.

Once the loop ends (when the genesis block is reached or there are no more nodes that want to forge), there might be a partially filled cluster (its size is less than n but more than 0). This cluster is also considered for addition to the final winner cluster, ensuring that all nodes that want to forge and have been grouped into clusters are accounted for.

Finally, the function returns the array clusters, which contains all the clusters of nodes that were formed based on their willingness to forge new blocks in the blockchain.

Thus, the depicted and described algorithm effectively organizes nodes into clusters for participation in the blockchain consensus process, ensuring that all nodes that wish to contribute by forging new blocks are given an opportunity to be grouped together based on the network-defined cluster size.

Figure 4:
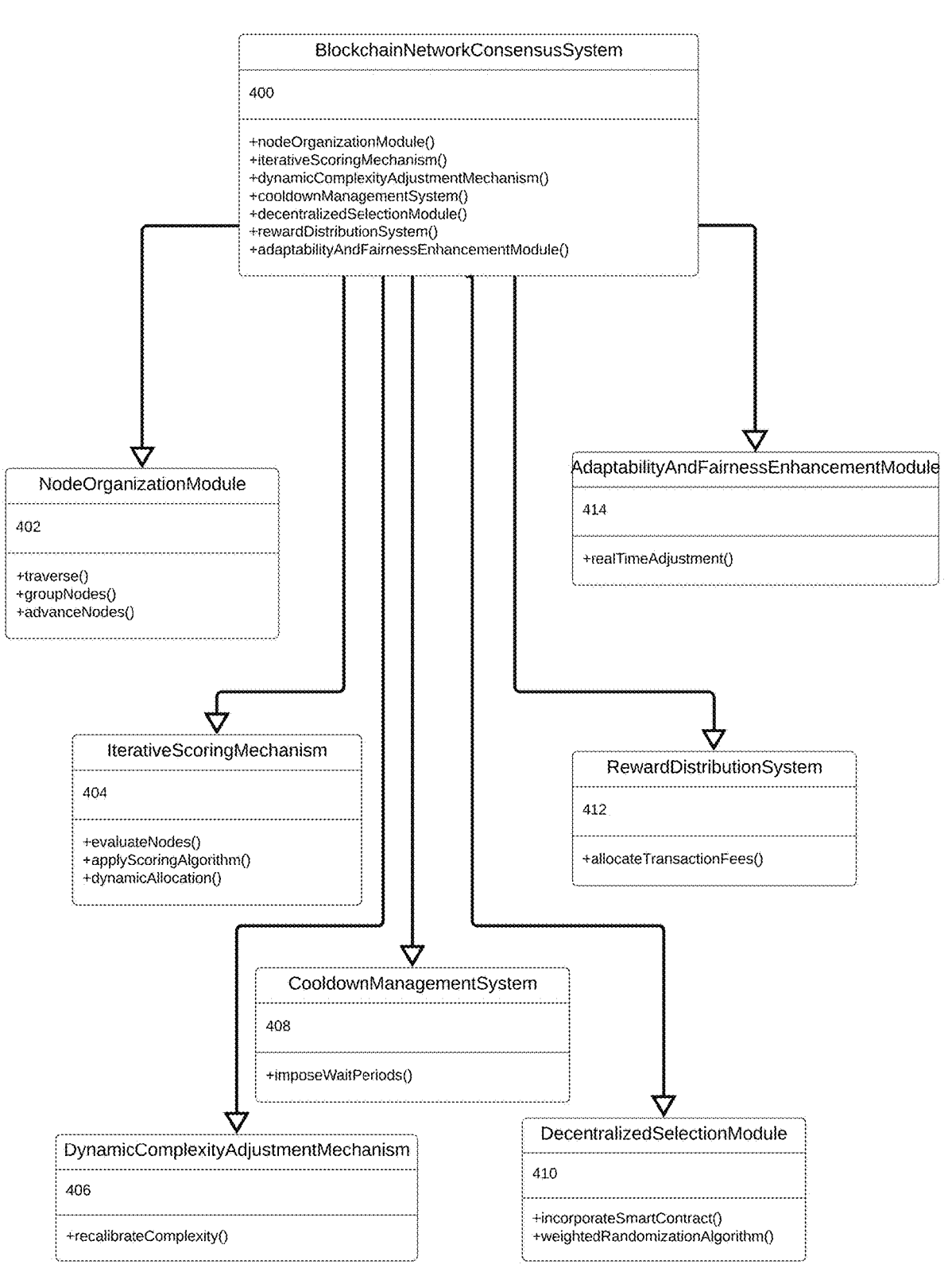
FIG. 4 is a sample class diagram for implementing a blockchain network consensus system in accordance with one or more aspects of the present disclosure.

By way of non-limiting disclosure, FIG. 4 is a sample class diagram for a detailed architecture of a blockchain network consensus system, delineated by various functional modules designed to streamline the consensus process within a blockchain network. The diagram is structured to reflect the systematic approach to achieving consensus, showcasing the interconnectivity and roles of different modules within the system.

At the core of the diagram, the Blockchain Network Consensus System (400) acts as the central framework that encompasses all other modules designed to facilitate consensus among nodes within a blockchain network. The Node Organization Module (402) is tasked with structuring the initial setup of nodes for consensus. It includes functions to traverse the blockchain using a closeness property (+traverse( )), to group nodes indicating participation intent into predefined clusters (+groupNodes( )), and to directly advance nodes not fitting into clusters to a scoring round (+advanceNodes( )), thereby ensuring inclusivity in participation opportunities.

The Iterative Scoring Mechanism (404) follows, focusing on the evaluation of nodes within clusters. This module enhances the consensus process by allowing peer nodes to evaluate one another (+evaluateNodes( )), applying a scoring algorithm that promotes fairness in winner selection (+applyScoringAlgorithm( )), and enabling the dynamic allocation of scores for nuanced influence on node rankings (+dynamicAllocation( )).

To address the changing needs of the blockchain network, the Dynamic Complexity Adjustment Mechanism (406) recalibrates the consensus mechanism's complexity (+recalibrateComplexity( )), adapting it from a high-demand mining-centric to a lower-complexity forging-centric approach based on network growth and transactional activity.

The Cooldown Management System (408) introduces mandatory wait periods (+imposeWaitPeriods( )) for nodes after their participation in the consensus mechanism. This system is designed to prevent any singular node from dominating the consensus process, promoting equitable participation opportunities.

Central to facilitating a fair selection process for consensus roles is the Decentralized Selection Module (410). It incorporates a smart contract to act as a load balancer (+incorporateSmartContract( )) and employs a weighted randomization algorithm (+weightedRandomizationAlgorithm( )) to determine node selection, ensuring a decentralized and equitable node engagement.

The Reward Distribution System (412) is integral to incentivizing participation, tasked with allocating transaction amounts accrued from successfully forged blocks to the participating nodes (+allocateTransactionAmounts( )), thus motivating sustained and active involvement in the system.

Figure 5:
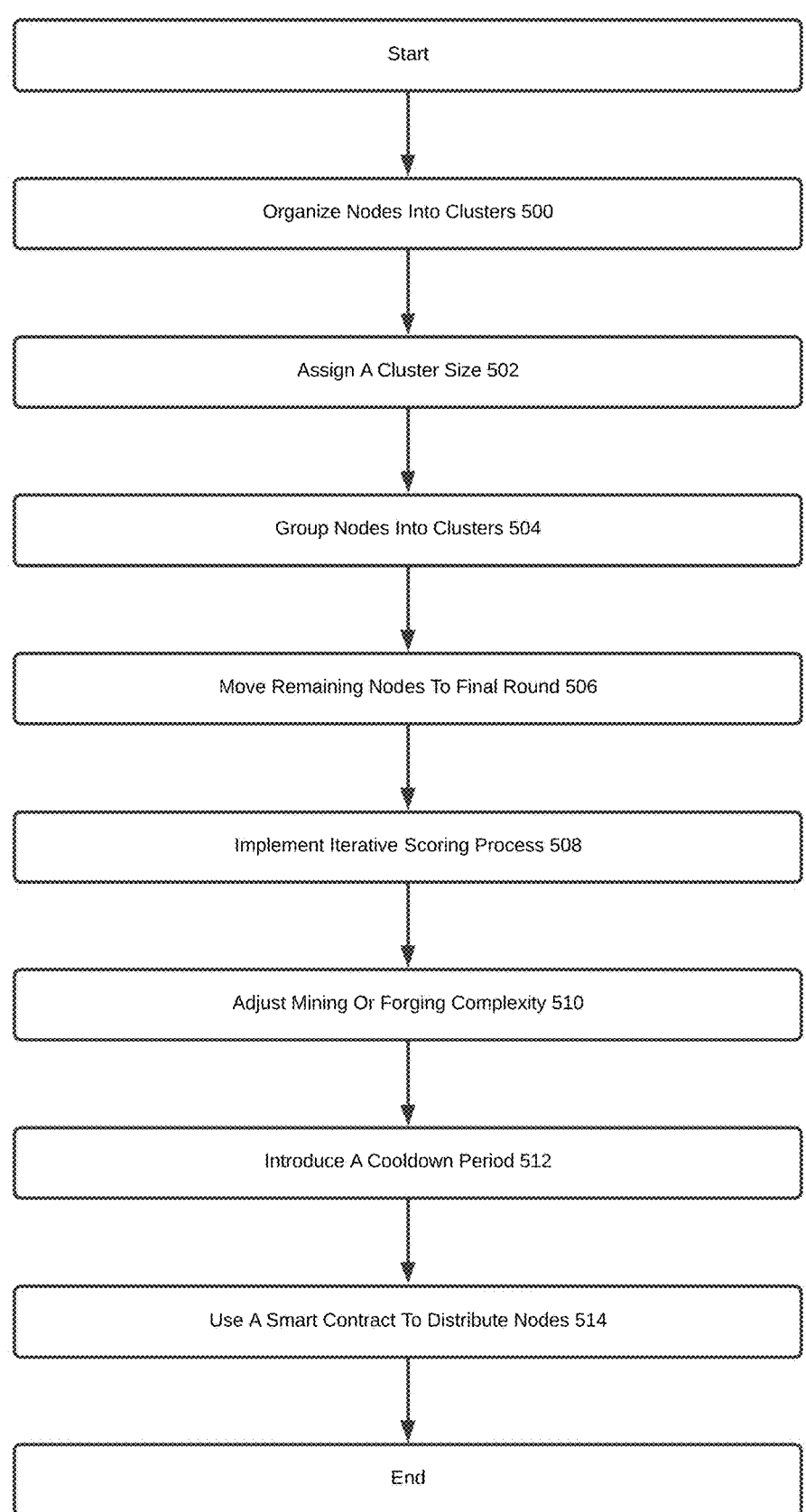
FIGS. 5 and 6 are sample flow diagrams for implementing methods for selecting nodes within a blockchain network for participation in a consensus mechanism in accordance with one or more aspects of the present disclosure.

Lastly, the Adaptability and Fairness Enhancement Module (414) underpins the system's capacity to dynamically adjust in real-time (+realTimeAdjustment( )), aligning the consensus process with the blockchain network's growth trajectory. This module employs strategies to ensure the system remains efficient, secure, and fair for all participating nodes, emphasizing the system's robustness and long-term viability. By way of non-limiting disclosure, FIG. 5 is a sample flow diagram for implementing a method for selecting nodes within a blockchain network for participation in a consensus mechanism in accordance with one or more aspects of the present disclosure. More specifically, the figure outlines the methodological steps involved in selecting nodes within a blockchain network for participation in a consensus mechanism, emphasizing the structured approach towards achieving a balanced and equitable consensus among participants.

The process begins with organizing nodes into clusters (500), a first step that lays the groundwork for consensus participation by identifying and grouping nodes based on their activity and proximity to the blockchain's developmental timeline, from the current block back to the genesis block. Following this foundational step, the system assigns a cluster size (502), determined by the network, to ensure that the clusters are of manageable sizes for effective evaluation and scoring.

Once the cluster sizes are defined, the nodes indicating a willingness to participate in the consensus mechanism are grouped into clusters accordingly (504). This step ensures that nodes with similar levels of activity and engagement are evaluated against each other, promoting fairness. Any remaining nodes that do not fit into the initial clusters due to numeric constraints are directly moved to a final round of scoring (506), ensuring that every node has an opportunity to participate in the consensus process regardless of initial clustering outcomes.

The system then implements an iterative scoring process within each cluster (508). In this phase, nodes are evaluated by their peers within the same cluster based on predefined criteria, with the significant stipulation that nodes cannot score themselves. This promotes an unbiased and meritocratic selection of a winning node from each cluster based on the cumulative scores received.

To adapt to the blockchain network's evolving needs, the system is equipped to adjust the mining or forging complexity (510) associated with the network's consensus mechanism. This adjustment is dynamically based on the network's size and transaction volume, ensuring scalability and operational efficiency by transitioning from a high-complexity mining-centric approach to a lower-complexity forging-centric approach as appropriate.

A cooldown period is then introduced (512) following a node's participation in the consensus mechanism. This cooldown period is designed to ensure fair rotation and equitable opportunity for all nodes to contribute to the blockchain network, effectively preventing any single node from dominating the consensus process.

The next step involves using a smart contract to distribute winning nodes across multiple queues (514). This distribution is governed by a smart contract acting as a load balancer, with each queue having a randomized chance of being selected for participation in the consensus process based on a weighted algorithm. This algorithm considers factors such as the queue nonce, the number of nodes within the queue, and the frequency of the queue's selection, ensuring a decentralized and fair participation in the consensus process.

The diagram concludes with the end of the process, encapsulating a comprehensive approach to node selection that emphasizes inclusivity, fairness, and adaptability to the blockchain network's growth.

Figure 6:
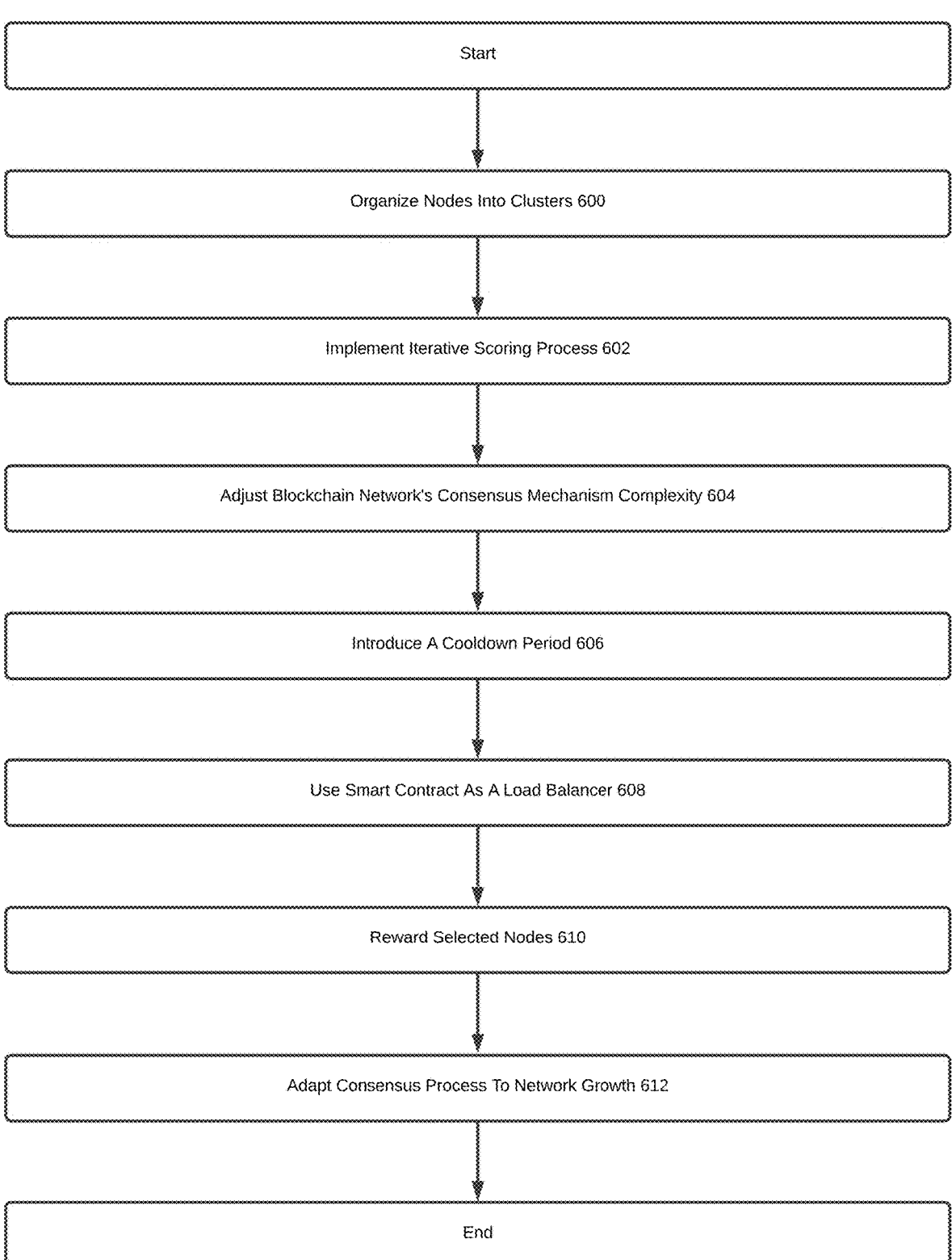

By way of non-limiting disclosure, FIG. 6 is another sample flow diagram for implementing a method for selecting nodes within a blockchain network for participation in a consensus mechanism in accordance with one or more aspects of the present disclosure.

The process initiates with organizing nodes into clusters (600), a step where nodes are grouped based on a closeness property which includes assessing the chronological order of node activity from the current block to the genesis block. This ensures that nodes indicating a desire to participate in the consensus mechanism are organized into clusters of a size predetermined by the network, while nodes not fitting these clusters due to size constraints are directly moved to a final scoring round for a comprehensive chance at participation.

The diagram progresses to implementing an iterative scoring process within each cluster (602), where each node is scored by their peers based on predefined criteria, excluding self-scoring. This stage incorporates a scoring formula where the number of scores a node can assign is equal to the total number of nodes within the cluster minus two. It also introduces the possibility for nodes to assign multiple scores to a single peer, thereby dynamically influencing the node's ranking within the cluster. This step is enhanced by including peer review sessions among nodes within the same cluster, allowing nodes to justify their scores based on the transaction history and contributions of their peers, adding a qualitative assessment to the scoring mechanism.

Following this, the flow diagram outlines the dynamic adjustment of the blockchain network's consensus mechanism complexity (604), transitioning from a high-complexity, mining-centric approach to a more sustainable, lower-complexity forging-centric approach as the network grows. This adjustment is calibrated through an algorithm that analyzes past transaction volumes, network participation rates, and the average time taken for a block to be forged, ensuring that the adjustment is both predictive and reflective of actual network conditions.

The introduction of a cooldown period (606) follows, designed to ensure fair rotation and equitable opportunity for all nodes wishing to contribute to the blockchain network. The duration of this cooldown period is based on the node's historical activity, with more active nodes subjected to shorter cooldown periods, rewarding consistent contributors with more frequent participation opportunities.

The use of a smart contract as a load balancer (608) has a central role in distributing winning nodes across multiple queues for equitable participation. Each queue's chance of being selected for participation in the consensus process is based on a randomized selection algorithm that prioritizes queues according to a weight calculation derived from a queue nonce, the number of nodes within the queue, and the frequency of the queue's selection. This mechanism is further refined with an audit mechanism to regularly evaluate the fairness and efficiency of queue selections.

Rewarding nodes selected (610) from each queue for their successful block forging efforts with the transaction amounts generated by that block serves as a participation incentive. This approach fosters active and sustained involvement in the consensus mechanism, encouraging continuous engagement from the participating nodes.

Finally, the process concludes with adapting the consensus process to network growth (612), employing mechanisms that scale the process and maintain efficiency, security, and fairness across all participating nodes, ensuring the system's long-term viability and robustness. This comprehensive approach encapsulates a methodical and structured procedure for achieving a decentralized and equitable consensus within the blockchain network.

Thus, new systems and methods have been disclosed that decentralize the selection of mining nodes through a cluster-based iterative scoring process within a multi-queue system. It introduces a dynamic scoring mechanism where nodes compete within clusters, and scores are assigned based on their performance. The winners from these clusters then enter a final selection process, which uses a smart contract as a load balancer to assign them to queues for mining opportunities. This system emphasizes randomness and decentralization, allowing any node to participate without specific hardware or digital assets. Sample features include decentralized node selection based on cluster scoring; dynamic mining complexity, which decreases as the blockchain grows, allowing for a shift from mining to forging; a cooling period for nodes after forging a block, preventing immediate re-entry into the forging queue; cluster formation based on the closeness property, using the blockchain's structure to group nodes; and a unique queue weighting system for random selection, ensuring fairness and decentralization. The mechanism is designed to be scalable, adjusting to network size and traffic. These and other features and elements described herein overcome the problems presented by the prior art.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for selecting nodes within a blockchain network for participation in a consensus mechanism, comprising the steps of:

organizing volunteer nodes within the blockchain network into clusters based on a closeness property with respect to blockchain progression from a genesis block to a current block;

assigning a cluster size determined by the blockchain network, wherein the volunteer nodes indicating a desire to participate in the consensus mechanism are grouped into said clusters up to a defined cluster size, and any remaining nodes that also want to participate are directly moved to a final round of scoring to compete against cluster winner nodes from said clusters;

implementing an iterative scoring process, where the volunteer nodes and cluster winner nodes are scored based on predefined criteria excluding self-scores, resulting in the selection of winners based on cumulative scores received from peers in each competitive scoring iteration;

dynamically adjusting mining or forging complexity associated with the consensus mechanism based on size and transaction volume for the blockchain network, facilitating a transition from a high-complexity mining-centric approach to a lower-complexity forging-centric approach;

introducing a cooldown period post-participation in the consensus mechanism for said winners, ensuring a fair and equitable opportunity for all of said volunteer nodes and remaining nodes to contribute to the blockchain network; and utilizing a smart contract as a load balancer to distribute the winners across multiple queues, wherein each of said queues has a randomized chance of being selected based on a weighted algorithm, ensuring decentralized and fair participation in a consensus process, wherein the weighted algorithm prioritizes the queues based on a queue weight calculated from a queue nonce, a node number of a quantity within each of the queues, and a frequency of which of the queues has been selected, and wherein the queue nonce is a randomly assigned decimal value between 0 and 1 at time of queue creation.

2. The method of claim 1, wherein the closeness property is determined by spatial arrangement of the volunteer nodes in relation to a most recent block extending back to the genesis block of the blockchain network.

3. The method of claim 2, wherein the remaining nodes not initially selected for any of said clusters are given an opportunity to compete directly in the final round of scoring alongside the cluster winner nodes.

4. The method of claim 3, where in the queues are self-balancing and a random selection algorithm determines which of the self-balancing queues participate in the consensus mechanism next.

5. The method of claim 1, wherein the iterative scoring process allows for the volunteer nodes within one of said clusters to assign scores to other volunteer nodes within the one of said clusters, excluding themselves, with a scoring formula being n−2, where n represents a total number of the volunteer nodes within the one of said clusters.

6. The method of claim 5, wherein said volunteer nodes within said clusters assign multiple scores to one of said volunteer nodes, enhancing a dynamic aspect of the scoring process and influencing a ranking of the volunteer nodes for selection.

7. The method of claim 6, wherein a selected node from each of said self-balancing queues, upon successfully forging a block, are rewarded with a transaction amount associated with that block, incentivizing participation in the consensus mechanism.

8. The method of claim 7, wherein at least three of said self-balancing queues are utilized in the consensus mechanism.

9. A method for selecting nodes within a blockchain network for participation in a consensus mechanism, comprising the steps of:

organizing nodes within the blockchain network into clusters by traversing from a current block to a genesis block based on a closeness property and grouping nodes indicating a desire to participate in the consensus mechanism into clusters of a predetermined size defined by the network, while directly moving any remaining nodes not fitting into these clusters due to size constraints to a final round of scoring;

implementing an iterative scoring process within each cluster, whereby each node within the cluster is scored by peer nodes based on predefined criteria, excluding any possibility for self-scoring, and using a formula where a number of scores each node can assign equals a total number of nodes within the cluster minus two, thereby facilitating the selection of a winning node from each cluster based on the highest cumulative scores received, and allowing a node to assign multiple scores to a single peer node to dynamically influence the node's ranking within the cluster;

dynamically adjusting complexity associated with the blockchain network's consensus mechanism, transitioning from a high-complexity mining-centric approach to a lower-complexity forging-centric approach as the network grows in size and transaction volume, thereby maintaining scalability and efficiency;

introducing a cooldown period following a node's participation in the consensus mechanism to ensure fair rotation and equitable opportunity for all nodes wishing to contribute to the blockchain network, thus preventing any single node from dominating the consensus process;

utilizing a smart contract functioning as a load balancer for distributing winning nodes across multiple queues, with each queue having a chance of being selected for participation in the consensus process based on a randomized selection algorithm that prioritizes queues according to a weight calculation derived from a randomly assigned queue nonce (a decimal value between 0 and 1 assigned at queue creation), the number of nodes within the queue, and frequency of the queue's selection, ensuring a decentralized and equitable participation, wherein the queue nonce is a randomly assigned decimal value between 0 and 1 at time of queue creation;

rewarding selected nodes from each queue, upon successfully forging a block, with transaction amounts associated with that block as an incentive for participation, thereby promoting active and continuous engagement within the consensus mechanism; and adapting the consensus process to growth of the blockchain network by employing mechanisms that scale the process and maintain efficiency, security, and fairness across all participating nodes, ensuring long-term viability and robustness.

10. The method of claim 9, wherein the closeness property for organizing nodes into clusters further comprises assessing a chronological order of node activity, with preference given to nodes having the most recent interactions with the blockchain, ensuring that active participants are prioritized in the consensus mechanism.

11. The method of claim 10, further comprising a step where the iterative scoring process includes peer review sessions among nodes within the same cluster, allowing nodes to justify their assigned scores based on a transaction history and contributions of their peers, thereby adding a qualitative assessment to a scoring mechanism.

12. The method of claim 11, wherein the dynamic adjustment of complexity is calibrated through an algorithm that analyzes past transaction volumes, network participation rates, and average time taken for a block to be forged, ensuring that the adjustment in complexity is both predictive and reflective of actual network conditions.

13. The method of claim 12, where the cooldown period following a node's participation in the consensus mechanism is determined based on nodal historical activity, with more active nodes subjected to shorter cooldown periods, thereby rewarding consistent contributors with more frequent opportunities to participate.

14. The method of claim 13, wherein the smart contract functioning as a load balancer further incorporates an audit mechanism that regularly evaluates the fairness and efficiency of queue selections, adjusting queue weights based on historical selection biases to ensure long-term decentralization and equitable node participation.

15. A blockchain network consensus system including a processor and memory comprising:

a node organization module configured to traverse the blockchain from a current block towards a genesis block utilizing a closeness property to sequence node interactions for prioritizing active nodes, to group nodes indicating participation intent into clusters according to a network-determined predefined size for structured consensus involvement, and to directly advance nodes not included in clusters due to numeric constraints to a comprehensive final scoring round for inclusive participation opportunity;

an iterative scoring mechanism within said node organization module engineered to facilitate peer nodes within each cluster to evaluate one another based on rigorously defined criteria that prohibit self-assessment, to apply a scoring algorithm where permissible scores a node can distribute equals the cluster's node count minus two for equitable winner selection based on cumulative peer evaluations, and to permit dynamic allocation of multiple scores to a single peer for nuanced influence on intra-cluster node rankings;

a dynamic complexity adjustment mechanism tasked with recalibrating complexity for the consensus mechanism from a mining-centric approach of high computational demand to a more sustainable forging-centric approach of lower complexity in direct response to fluctuations in network size and transactional activity, ensuring scalability and operational efficiency;

a cooldown management system designed to impose mandatory wait periods on nodes following their consensus mechanism participation, with a duration predicated on nodal engagement history and blockchain contribution to democratize subsequent participation opportunities and prevent dominance by any singular node;

a decentralized selection module incorporating a smart contract as a load balancer for equitable distribution of scoring mechanism victors across diverse queues, wherein selection for consensus role is determined by a weighted randomization algorithm that factors in a queue nonce—a randomly assigned decimal value at creation—alongside node density and historical selection frequency, ensuring fair and decentralized node engagement, wherein the queue nonce is a randomly assigned decimal value between 0 and 1 at time of queue creation;

a reward distribution system integrated within said decentralized selection module, tasked with allocation of transaction amounts accrued from successfully forged blocks to the nodes elected for consensus roles as a motivator for sustained and active system involvement; and an adaptability and fairness enhancement module, essential for real-time adjustment of the consensus process in alignment with growth trajectory for the blockchain network, employing scalable strategies to preserve efficiency, ensure network security, and uphold fairness across an ecosystem of participating nodes.

16. The system of claim 15, wherein the closeness property for node organization further includes an analysis of a transaction volume and frequency of each node's participation in the consensus mechanism over a predetermined period, thereby refining the prioritization of nodes for cluster grouping and ensuring that nodes contributing significantly to blockchain activity are given precedence in a consensus participation process.

17. The system of claim 16, further comprising an enhancement to the iterative scoring mechanism where predefined criteria for node evaluation extend to include a review of nodal historical accuracy in transaction verification and its computational contribution to the network, aiming to foster a higher quality of consensus and reward nodes demonstrating consistent reliability and substantial network support.

18. The system of claim 17, wherein the dynamic complexity adjustment mechanism is configured to automatically update a complexity threshold for the consensus mechanism in real-time based on an algorithmic assessment of network congestion levels, transaction pending times, and overall blockchain scalability metrics, ensuring that the network maintains optimal efficiency and responsiveness to changing operational demands.

* * * * *